(12) United States Patent
Suk et al.

(10) Patent No.: US 11,946,734 B2
(45) Date of Patent: Apr. 2, 2024

(54) METHOD, SYSTEM, AND NON-TRANSITORY COMPUTER-READABLE RECORDING MEDIUM FOR MEASURING PHYSICAL QUANTITIES ASSOCIATED WITH A GOLF CLUB

(71) Applicant: CREATZ INC., Suwon-si (KR)

(72) Inventors: Yong Ho Suk, Seongnam-si (KR); Jey Ho Suk, Seoul (KR)

(73) Assignee: CREATZ INC., Suwon-si (KR)

( * ) Notice: Subject to any disclaimer, the term of this patent is extended or adjusted under 35 U.S.C. 154(b) by 477 days.

(21) Appl. No.: 17/204,284

(22) Filed: Mar. 17, 2021

(65) Prior Publication Data
US 2021/0223032 A1   Jul. 22, 2021

Related U.S. Application Data

(63) Continuation of application No. PCT/KR2021/000421, filed on Jan. 12, 2021.

(30) Foreign Application Priority Data

Jan. 16, 2020 (KR) .................. 10-2020-0006249
Oct. 30, 2020 (KR) .................. 10-2020-0143827

(51) Int. Cl.
*G01B 11/26* (2006.01)
*A63B 60/42* (2015.01)
*G01B 5/00* (2006.01)

(52) U.S. Cl.
CPC .............. *G01B 11/26* (2013.01); *A63B 60/42* (2015.10); *G01B 5/0023* (2013.01)

(58) Field of Classification Search
USPC ............................................. 33/508; 473/151
See application file for complete search history.

(56) References Cited

U.S. PATENT DOCUMENTS

| | | | | |
|---|---|---|---|---|
| 7,542,130 B2* | 6/2009 | Saegusa | ............. | A63B 69/3614 356/28 |
| 8,708,833 B2* | 4/2014 | Ueda | ...................... | A63B 60/42 473/198 |
| 8,734,264 B2* | 5/2014 | Saito | ........................ | G06T 7/73 473/223 |

(Continued)

FOREIGN PATENT DOCUMENTS

| | | |
|---|---|---|
| JP | H07227453 A | 8/1995 |
| JP | 2009045495 A | 3/2009 |

(Continued)

*Primary Examiner* — Yaritza Guadalupe-McCall
(74) *Attorney, Agent, or Firm* — Dinsmore & Shohl LLP; Yongsok Choi, Esq.

(57) ABSTRACT

The present invention relates to a method, system, and non-transitory computer-readable recording medium for measuring physical quantities associated with a golf club. According to one aspect of the invention, there is provided a method for measuring physical quantities associated with a golf club, the method comprising the steps of: detecting a first marker and a second marker of different shapes in at least one image of a head of a golf club for which physical quantities are to be measured; and measuring the physical quantities associated with the golf club with reference to properties of a target area specified on the basis of the first marker and the second marker.

15 Claims, 5 Drawing Sheets

(56) References Cited

U.S. PATENT DOCUMENTS

| | | | | |
|---|---|---|---|---|
| 8,758,151 B2* | 6/2014 | Kimizuka | ........... | A63B 69/3658 |
| | | | | 473/409 |
| 8,951,138 B2* | 2/2015 | Kiraly | ................ | A63B 69/3658 |
| | | | | 473/223 |
| 9,329,037 B2* | 5/2016 | Suk | ...................... | A63B 71/022 |
| 11,077,351 B2* | 8/2021 | Xu | .................... | A63B 71/0622 |
| 11,229,824 B2* | 1/2022 | Kwon | .................... | G06V 40/23 |
| 11,475,599 B2* | 10/2022 | Shaw | ................... | A63B 53/047 |
| 2013/0305806 A1* | 11/2013 | Saito | ....................... | G06T 7/246 |
| | | | | 73/11.01 |
| 2015/0018130 A1* | 1/2015 | Johnson | ................. | G06V 40/23 |
| | | | | 473/409 |
| 2017/0354844 A1* | 12/2017 | Nomura | ............. | A63B 69/0002 |

FOREIGN PATENT DOCUMENTS

| | | | | |
|---|---|---|---|---|
| JP | 2013052079 A | | 3/2013 | |
| JP | 2014079474 A | | 5/2014 | |
| JP | 2015009008 A | | 1/2015 | |
| JP | 2017113585 A | | 6/2017 | |
| JP | 2017156095 A | * | 9/2017 | ............ A63B 69/36 |
| KR | 100818169 B1 | | 4/2008 | |
| KR | 102030997 B1 | | 10/2019 | |
| WO | WO-2014061707 A1 | * | 4/2014 | ............ G06T 7/246 |
| WO | 2017006875 A1 | | 1/2017 | |

* cited by examiner

METHOD, SYSTEM, AND NON-TRANSITORY COMPUTER-READABLE RECORDING MEDIUM FOR MEASURING PHYSICAL QUANTITIES ASSOCIATED WITH A GOLF CLUB

CROSS-REFERENCE TO RELATED APPLICATION(S)

This application is a continuation application of Patent Cooperation Treaty (PCT) International Application No. PCT/KR2021/000421 filed on Jan. 12, 2021, which claims priority to Korean Patent Application Nos. 10-2020-0006249 and 10-2020-0143827 filed on Jan. 16, 2020 and Oct. 30, 2020. The entire contents of PCT International Application No. PCT/KR2021/000421 and Korean Patent Application Nos. 10-2020-0006249 and 10-2020-0143827 are hereby incorporated by reference.

FIELD OF THE INVENTION

The present invention relates to a method, system, and non-transitory computer-readable recording medium for measuring physical quantities associated with a golf club.

BACKGROUND

Virtual golf systems are widely spreading which allow golfers to virtually play golf at low cost in downtown areas and the like. The basic concept of such virtual golf systems is to measure physical quantities associated with a golf club when a golf ball is hit by a golfer, on the basis of a trajectory or the like of the golf club with respect to the ball, and to perform a simulation of the shot and display a result of the simulation on a screen.

In connection with the foregoing, Korean Registered Patent No. 10-0818169 discloses a technique for calculating a swing trajectory of a golf club on the basis of an electronic sensing device that is provided at one end of a grip of the golf club to sense acceleration and angular velocity in triaxial directions.

However, according to the techniques introduced so far as well as the above-described conventional technique, there are problems that it is difficult to meet the demands of golfers who want to use their own or other types of golf clubs in order to select golf clubs that suit their body types or create an environment similar to a real game situation, and that time or cost is required to maintain the golf clubs.

In this connection, the inventor(s) present a novel and inventive technique capable of measuring physical quantities associated with a golf club on the basis of a plurality of markers formed on a head of the golf club.

SUMMARY OF THE INVENTION

One object of the present invention is to solve all the above-described problems in the prior art.

Another object of the invention is to accurately measure physical quantities associated with a golf club with only two markers of different shapes that are detected at a head of the golf club for which the physical quantities are to be measured.

Yet another object of the invention is to accurately measure physical quantities associated with a golf club without using a separate complex apparatus for calculating a swing trajectory of the golf club.

The representative configurations of the invention to achieve the above objects are described below.

According to one aspect of the invention, there is provided a method for measuring physical quantities associated with a golf club, the method comprising the steps of: detecting a first marker and a second marker of different shapes in at least one image of a head of a golf club for which physical quantities are to be measured; and measuring the physical quantities associated with the golf club with reference to properties of a target area specified on the basis of the first marker and the second marker.

According to another aspect of the invention, there is provided a system for measuring physical quantities associated with a golf club, the system comprising: a marker detection unit configured to detect a first marker and a second marker of different shapes in at least one image of a head of a golf club for which physical quantities are to be measured; and a physical quantity measurement unit configured to measure the physical quantities associated with the golf club with reference to properties of a target area specified on the basis of the first marker and the second marker.

In addition, there are further provided other methods and systems to implement the invention, as well as non-transitory computer-readable recording media having stored thereon computer programs for executing the methods.

According to the invention, it is possible to accurately measure physical quantities associated with a golf club with only two markers of different shapes that are detected at a head of the golf club for which the physical quantities are to be measured.

According to the invention, it is possible to accurately measure physical quantities associated with a golf club without using a separate complex apparatus for calculating a swing trajectory of the golf club.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of a Measurement System

Figure 1:
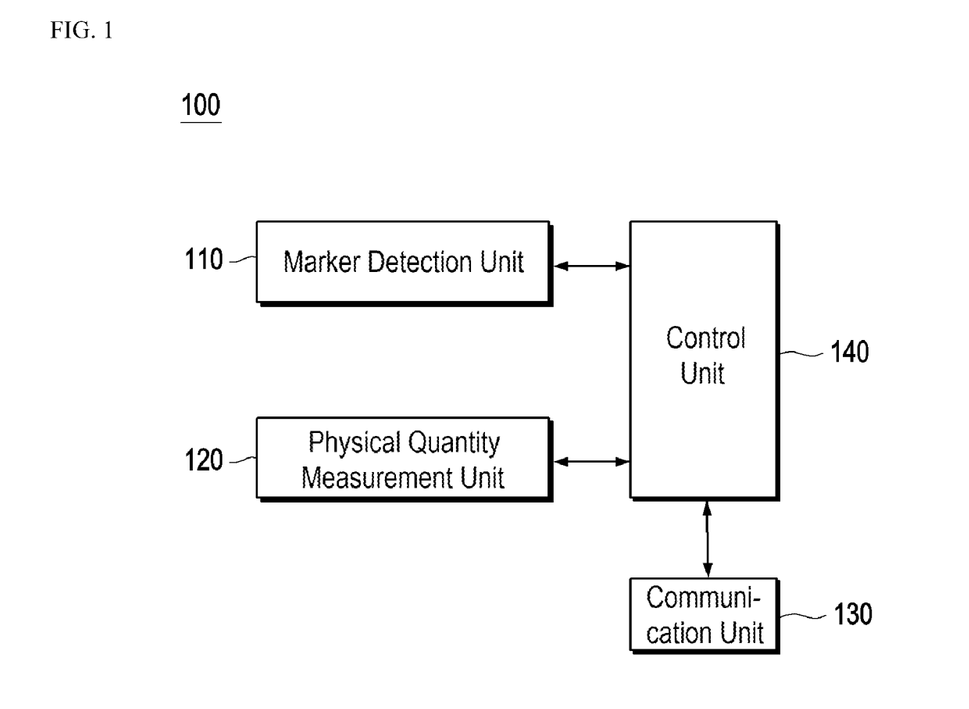
FIG. 1 specifically shows the internal configuration of a measurement system according to one embodiment of the invention.

FIG. 1 specifically shows the internal configuration of a measurement system 100 according to one embodiment of the invention.

Referring to FIG. 1, the measurement system 100 may comprise a marker detection unit 110, a physical quantity measurement unit 120, a communication unit 130, and a control unit 140. According to one embodiment of the invention, at least some of the marker detection unit 110, the physical quantity measurement unit 120, the communication unit 130, and the control unit 140 may be program modules that communicate with an external system (not shown). The program modules may be included in the measurement system 100 in the form of operating systems, application program modules, and other program modules, while they may be physically stored in a variety of commonly known storage devices. Further, the program modules may also be stored in a remote storage device that may communicate with the measurement system 100. Meanwhile, such program modules may include, but not limited to, routines, subroutines, programs, objects, components, and data structures for performing specific tasks or executing specific abstract data types according to the invention as will be described below.

Meanwhile, the above description is illustrative although the measurement system 100 has been described as above, and it will be apparent to those skilled in the art that at least a part of the functions or components of the measurement system 100 may be implemented or included in a known virtual golf simulation system, as necessary. Further, in some cases, all the functions and components of the measurement system 100 may be implemented or included in a known virtual golf simulation system.

First, the marker detection unit 110 according to one embodiment of the invention may function to detect a first marker and a second marker of different shapes in at least one image of a head of a golf club for which physical quantities are to be measured.

For example, the marker detection unit 110 may detect a first marker and a second marker of different shapes from a first image among a plurality of images of a head of a golf club for which physical quantities are to be measured, and may detect the first marker and the second marker of different shapes from a second image temporally adjacent to the first image among the plurality of images.

Figure 2A:
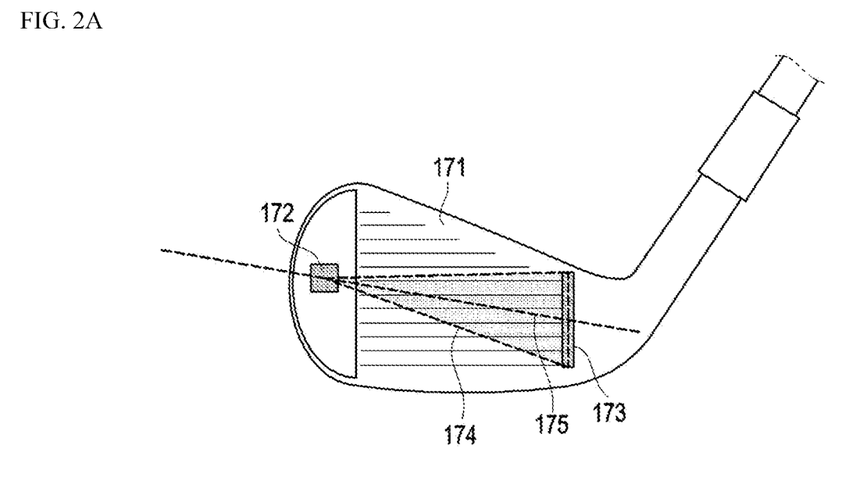
FIG. 2A illustratively shows markers on a golf club head according to one embodiment of the invention.
Figure 2B:
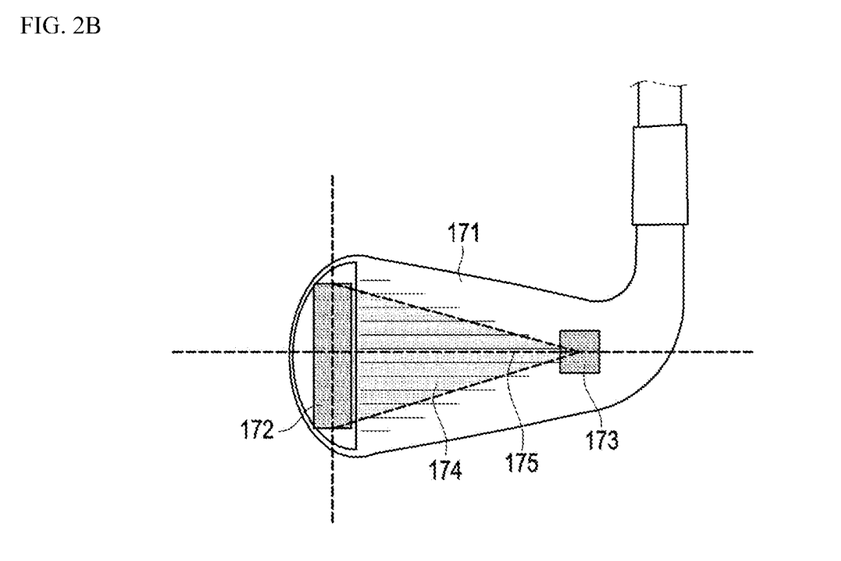
FIG. 2B illustratively shows markers on a golf club head according to one embodiment of the invention.

FIGS. 2A and 2B illustratively shows markers on a golf club head according to one embodiment of the invention.

Referring to FIGS. 2A and 2B, a first marker 172 and a second marker 173 may be arranged to be symmetrical to each other around a face area of a head 171 of the golf club. For example, the first marker 172 and the second marker 173 may be arranged on left and right sides or upper and lower sides with respect to the face area (e.g., with respect to an imaginary center line 175 specified on the basis of the center of the face area), respectively, or may be arranged in a heel area and a toe area adjacent to the face area (e.g. in the central parts of these areas), respectively. Further, the first marker 172 and the second marker 173 may have different aspect ratios. For example, the aspect ratio of the first marker 172 may be 1 and the aspect ratio of the second marker 173 may be greater than (or less than) 1 (e.g., 4 or 0.25). More specifically, the first marker 172 may be in the shape of a dot (e.g., a square shape having an aspect ratio of 1 and a size of 5 mm×5 mm), and the second marker 173 may be in the shape of a bar (e.g., a rectangular shape having an aspect ratio greater than or less than 1 and a size of 5 mm×20 mm). Meanwhile, it is noted that the shapes of the first marker 172 and the second marker 173 are not necessarily limited to the above-described embodiments, and may be changed to various shapes (e.g., a circle, ellipse, pentagon, hexagon, etc.) as long as the objects of the invention may be achieved. In addition, the first marker 172 and the second marker 173 may be formed using a material having a reflectance not less than a predetermined level for light or illumination (e.g., an aluminum material), and the predetermined level may indicate a degree to which the measurement system 100 according to the invention (or the naked eye) can identify the first marker 172 and the second marker 173 from an image acquired by a photographing module (e.g., based on visible light, infrared light, or ultraviolet light) for photographing the head 171 of the golf club. Meanwhile, the first marker 172 and the second marker 173 may be formed to be very thin in order to minimize air resistance or the like that affects swing of the golf club. Further, an adhesive layer that enables attachment/detachment to/from one side (specifically, the side where the ball is hit) of the head 171 of the golf club (e.g., a layer where an adhesive is applied or Velcro is formed) may be formed on one side of each of the first marker 172 and the second marker 173. Alternatively, the markers may be fixed to the head of the golf club by means of lamination, coating, or the like.

Next, the physical quantity measurement unit 120 according to one embodiment of the invention may function to specify a target area on the basis of the first marker and the second marker detected by the marker detection unit 110. Here, the target area according to one embodiment of the invention may be an area formed in two dimensions or three dimensions. For example, the target area may be specified as a two-dimensional or three-dimensional figure or plane such as a triangle, quadrangle, triangular pyramid, quadrangular pyramid, and cone.

For example, the physical quantity measurement unit 120 may specify dots and lines from the first marker and the second marker detected in the at least one image, respectively, and may specify the target area on the basis of the dots and lines.

More specifically, referring to FIG. 2A, when the first marker 172 is in the shape of a square and the second marker 173 is in the shape of a rectangle, the physical quantity measurement unit 120 may specify a two-dimensional figure (e.g., a triangle) formed by connecting a center point specified from the first marker 172 (i.e., the center point of the square) and a center line specified from the second marker 173 (i.e., a line passing through the center point of the rectangle and extending in the longitudinal direction) as a target area 174. Referring to FIG. 2B, when the first marker 172 is in the shape of a rectangle and the second marker 173 is in the shape of a square, the physical quantity measurement unit 120 may specify a two-dimensional figure (e.g., a triangle) formed by connecting a center line specified from the first marker 172 (i.e., a line passing through the center point of the rectangle and extending in the longitudinal direction) and a center point specified from the second marker 173 (i.e., the center point of the square) as the target area 174.

As another example, when the first marker is in the shape of an ellipse and the second marker is in the shape of a circle, the physical quantity measurement unit 120 may specify a plane including a center line specified from the first marker (i.e., a line passing through the center point of the ellipse and extending in the major or minor axis direction) and a center point specified from the second marker (i.e., the center point of the circle) as the target area.

Further, the physical quantity measurement unit 120 may measure the physical quantities associated with the golf club with reference to properties of the target area. Here, the properties of the target area according to one embodiment of the invention may encompass physical or mathematical properties (e.g., a position, direction, size, tilt, angle, etc.) of a target area specified in an image of the head of the golf club. Further, the physical quantities according to one embodiment of the invention may include information on a traveling velocity, acceleration, angular velocity, traveling direction, lie angle, attack angle, face angle, hit position, and the like of the golf club.

For example, the physical quantity measurement unit 120 may specify an angle in which a shaft of the golf club is tilted with respect to a ground surface, on the basis of an angle in which a target area of at least one image of the head of the golf club is tilted with respect to a reference surface (e.g., the ground surface), and may measure a lie angle of the golf club on the basis of the specified angle in which the shaft is tilted.

As another example, the physical quantity measurement unit 120 may specify an attack angle of the golf club on the basis of an angle between a reference surface (e.g., the ground surface) and a normal line of a target area specified in at least one image of the head of the golf club.

As yet another example, the physical quantity measurement unit 120 may measure a traveling direction of the golf club and a change in the traveling direction by comparing and analyzing an angle between a reference plane and a normal line of a first target area specified in a first image among a plurality of images of the head of the golf club, and an angle between the reference plane and a normal line of a second target area specified in a second image among the plurality of images.

As still another example, the physical quantity measurement unit 120 may measure a traveling velocity, acceleration, angular velocity, and the like of the golf club with reference to an interval between times of photographing a first image and a second image among a plurality of images of the head of the golf club (e.g., the interval may be specified with reference to a frame rate at which the images are photographed) and a change in position or size between a first target area specified in the first image and a second target area specified in the second image.

Meanwhile, in order to measure the physical quantities associated with the golf club, the physical quantity measurement unit 120 may refer to a lookup table for physical quantities of the golf club corresponding to properties of the target area or changes in the properties of the target area, or may use a result of learning (e.g., machine learning, deep learning, etc.) for physical quantities of the golf club corresponding to properties of the target area or changes in the properties of the target area.

Next, the communication unit 130 according to one embodiment of the invention may function to enable data transmission/reception from/to the marker detection unit 110 and the physical quantity measurement unit 120.

Lastly, the control unit 140 according to one embodiment of the invention may function to control data flow among the marker detection unit 110, the physical quantity measurement unit 120, and the communication unit 130. That is, the control unit 140 may control data flow into/out of the measurement system 100 or data flow among the respective components of the measurement system 100, such that the marker detection unit 110, the physical quantity measurement unit 120, and the communication unit 130 may carry out their particular functions, respectively.

Figure 3:
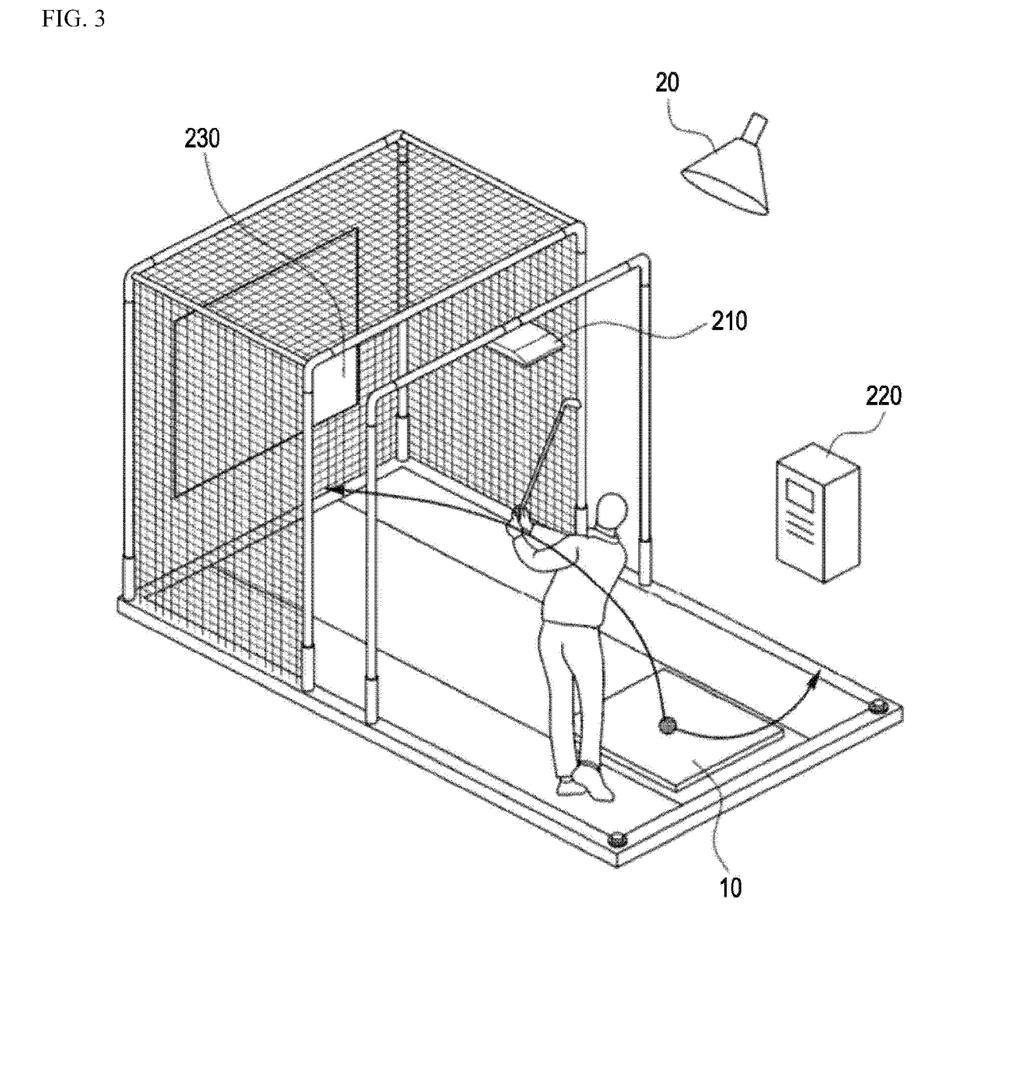
FIG. 3 illustratively shows a situation in which a measurement system according to the invention is utilized in a virtual golf simulation system according to one embodiment of the invention.

FIG. 3 illustratively shows a situation in which the measurement system 100 according to the invention is utilized in a virtual golf simulation system 200 according to one embodiment of the invention.

As shown in FIG. 3, the virtual golf simulation system 200 may comprise a shot unit 10, an illumination device 20, a photographing device 210, a simulator 220, and a display device 230. Further, the simulator 220 according to one embodiment of the invention may include the measurement system 100 according to the invention.

First, the shot unit 10 according to one embodiment of the invention may be a part on which a golfer steps up to place and hit a golf ball when using the virtual golf simulation system 200. The shot unit 10 may include a known swing plate, the tilt angle of which may be adjusted. It is noted that when the invention is applied to other kinds of virtual sport simulation systems, those skilled in the art may modify the configuration of the shot unit 10 (and the configurations of other components associated therewith, if necessary) to suit to the characteristics of the corresponding sports.

Next, the illumination device 20 according to one embodiment of the invention may irradiate light artificially when the golfer plays virtual golf indoors or outdoors. As necessary, the illumination device 20 may be turned on and off, or the brightness thereof may be adjusted. Preferably, the illumination device 20 may be an infrared illumination device (e.g., an LED illumination device) for preventing natural deterioration of golf club head images caused by the flickering of the light.

Next, the photographing device 210 according to one embodiment of the invention may include at least one camera (e.g., a high-speed camera, a stereo camera, etc.) (not shown) and function to acquire images of a golf club head (e.g., images of a moving golf club head). The photographing device 210 may be placed in a location to look down at the moving golf club head as shown in FIG. 3, while it may be placed in other locations. Meanwhile, the photographing device 210 according to one embodiment of the invention may function similarly to a high-speed camera by sequentially acquiring images of the golf club head using at least two cameras having different photographing speeds, or may function similarly to a three-dimensional camera by simultaneously acquiring images of the golf club head using two two-dimensional cameras.

Meanwhile, according to one embodiment of the invention, an image photographed by the photographing device 210 may be considered to be better if a shape of a marker is more clearly specified from the surface of the golf club head. For example, the simulator 220 to be described below may more accurately specify a marker appearing in each image of the golf club head and a target area based on the marker if the marker is more clearly specified in the image of the golf club head, so that physical quantities associated with the golf club (e.g., a traveling velocity, acceleration, angular velocity, traveling direction, lie angle, attack angle, face angle, hit position, and the like of the golf club) may be more accurately calculated.

Next, the simulator 220 according to one embodiment of the invention may function to detect a first marker and a second marker of different shapes in at least one image of a head of a golf club for which physical quantities are to be measured, and to measure the physical quantities associated with the golf club with reference to properties of a target area specified on the basis of the first marker and the second marker.

Meanwhile, the simulator 220 according to one embodiment of the invention may communicate with the photographing device 210 and the display device 230, and may include a dedicated processor for the virtual golf simulation system 200. The dedicated processor may be provided with a memory means and may have capabilities for numerical operations and graphics processing.

Lastly, the display device 230 according to one embodiment of the invention may function to display results of the physical quantity measurement, virtual reality implementation, and the like of the simulator 220. The display device 230 may display images via a display means and, for example, may comprise a screen, which absorbs the impact of the hit golf ball and does not emit light directly, and a projector to output images on the screen.

Hereinafter, it will be discussed how physical quantities associated with a golf club are measured when a user hits a golf ball with the golf club using the above-described virtual golf simulation system 200.

First, when the golf ball is hit by the user on the shot unit 10 according to one embodiment of the invention, the photographing device 210 may acquire a plurality of images of a head of the golf club hitting the golf ball.

Next, the simulator 220 according to one embodiment of the invention may detect a first marker and a second marker of different shapes in each of the plurality of images (which are temporally adjacent, for example).

Next, the simulator 220 according to one embodiment of the invention may measure the physical quantities associated with the golf club with reference to properties of a first target area specified on the basis of the first marker and the second marker detected from a first image among the plurality of images, and properties of a second target area specified on the basis of the first marker and the second marker detected from a second image among the plurality of images.

Figure 4:
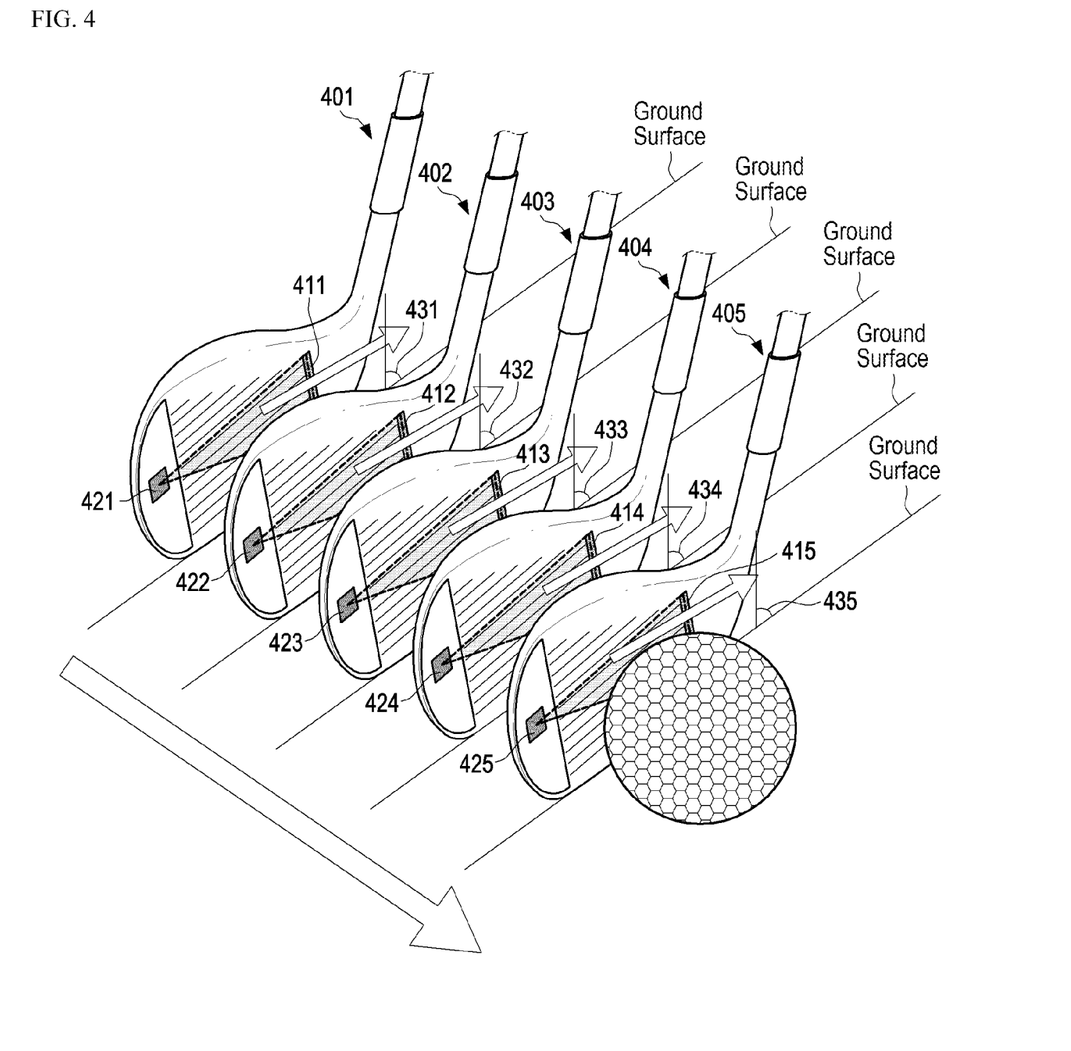
FIG. 4 illustratively shows a situation in which physical quantities associated with a golf club are measured according to one embodiment of the invention.

FIG. 4 illustratively shows a situation in which physical quantities associated with a golf club are measured according to one embodiment of the invention.

First, referring to FIG. 4, a plurality of images 401, 402, 403, 404, and 405 may be acquired in which a head of a golf club hitting a golf ball is photographed.

Next, a first marker 411, 412, 413, 414, 415 in the shape of a rectangle and a second marker 421, 422, 423, 424, 425 in the shape of a square may be detected in each of the plurality of images, and target areas may be respectively specified on the basis of the first marker 411, 412, 413, 414, 415 and the second marker 421, 422, 423, 424, 425 detected as above.

Next, an attack angle (or traveling direction) of the golf club and a physical quantity related to a change in the attack angle may be measured on the basis of an angle between a ground surface (or reference surface) and a normal line specified with respect to each of the target areas. A lie angle 431, 432, 433, 434, 435 of the golf club and a physical quantity related to a change in the lie angle 431, 432, 433, 434, 435 may be measured on the basis of an angle between the ground surface and a shaft specified with respect to each of the target areas. Further, a physical quantity related to a traveling velocity of the golf club may be measured by analyzing a position of each of the target areas with reference to an interval between times at which the plurality of images 401, 402, 403, 404, and 405 are photographed.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for measuring physical quantities associated with a golf club, the method comprising the steps of:
    detecting a first marker and a second marker of different shapes in at least one image of a head of a golf club for which physical quantities are to be measured; and
    measuring the physical quantities associated with the golf club with reference to properties of a target area specified on the basis of the first marker and the second marker,
    wherein in the measuring step, the physical quantities associated with the golf club are measured with reference to an interval between times of photographing a first image and a second image among a plurality of images of the head of the golf club, and a change in size between a first target area specified in the first image and a second target area specified in the second image.

2. The method of claim 1, wherein the first marker and the second marker are arranged to be symmetrical to each other around a face area of the head of the golf club.

3. The method of claim 1, wherein the first marker and the second marker have different aspect ratios.

4. The method of claim 1, wherein the target area is specified on the basis of a dot specified from the first marker and a line specified from the second marker.

5. The method of claim 4, wherein the target area is specified as a figure formed by connecting a center point specified from the first marker and a center line specified from the second marker.

6. The method of claim 4, wherein the target area is specified as a plane including a dot specified from the first marker and a line specified from the second marker.

7. The method of claim 1, wherein in the measuring step, at least one of a traveling direction, an attack angle, and a lie angle of the golf club is determined with reference to an angle in which the target area is tilted with respect to a reference surface.

8. A non-transitory computer-readable recording medium having stored thereon a computer program for executing the method of claim 1.

9. A system for measuring physical quantities associated with a golf club, the system comprising:
   a marker detection unit configured to detect a first marker and a second marker of different shapes in at least one image of a head of a golf club for which physical quantities are to be measured; and
   a physical quantity measurement unit configured to measure the physical quantities associated with the golf club with reference to properties of a target area specified on the basis of the first marker and the second marker,
   wherein the physical quantity measurement unit is configured to measure the physical quantities associated with the golf club with reference to an interval between times of photographing a first image and a second image among a plurality of images of the head of the golf club, and a change in size between a first target area specified in the first image and a second target area specified in the second image.

10. The system of claim 9, wherein the first marker and the second marker are arranged to be symmetrical to each other around a face area of the head of the golf club.

11. The system of claim 9, wherein the first marker and the second marker have different aspect ratios.

12. The system of claim 9, wherein the target area is specified on the basis of a dot specified from the first marker and a line specified from the second marker.

13. The system of claim 12, wherein the target area is specified as a figure formed by connecting a center point specified from the first marker and a center line specified from the second marker.

14. The system of claim 12, wherein the target area is specified as a plane including a dot specified from the first marker and a line specified from the second marker.

15. The system of claim 9, wherein the physical quantity measurement unit is configured to determine at least one of a traveling direction, an attack angle, and a lie angle of the golf club with reference to an angle in which the target area is tilted with respect to a reference surface.

\* \* \* \* \*